United States Patent [19]

Nagasawa et al.

[11] 4,069,061
[45] Jan. 17, 1978

[54] CERAMICS HAVING NONLINEAR VOLTAGE CHARACTERISTICS

[75] Inventors: Ikuo Nagasawa; Kazuo Mukae; Takashi Ishii; Koichi Tsuda, all of Kawasaki, Japan

[73] Assignee: Fuji Electric Co., Ltd., Kawasaki, Japan

[21] Appl. No.: 701,279

[22] Filed: June 30, 1976

[30] Foreign Application Priority Data

June 30, 1975 Japan .................................. 50-80594
June 30, 1975 Japan .................................. 50-80595

[51] Int. Cl.$^2$ ........................ C04B 35/50; H01C 7/10; H01C 7/12
[52] U.S. Cl. .................................. 106/73.2; 252/519; 252/521; 338/20
[58] Field of Search ................ 106/73.2; 252/519, 521

[56] References Cited

U.S. PATENT DOCUMENTS

| 3,503,029 | 3/1970 | Matsuoka | 338/20 |
| 3,903,226 | 9/1975 | Iga et al. | 252/519 |
| 3,928,242 | 12/1975 | May | 338/20 |

FOREIGN PATENT DOCUMENTS 2,413,485  10/1974  Germany .......................... 106/73.2

OTHER PUBLICATIONS

Matsuoka, M.–"Nonohmic Properties of Zinc Oxide Ceramics," Jap. J. of Appl. Physics, 10(6) June 1971, pp. 736–746.

*Primary Examiner*—Helen M. McCarthy
*Attorney, Agent, or Firm*—Rothwell, Mion, Zinn and Macpeak Sughrue

[57] ABSTRACT

Ceramics having nonlinear voltage characteristics in which (1) zinc oxide is used as a main component and (2) praseodymium, (3) one or more of magnesium or calcium, and (4) cobalt are added thereto as subcomponents, in elemental form or as a compound thereof, in an amount of from about 0.08 to about 10.0 atomic % for praseodymium, from about 0.08 to about 10.0 atomic % for the one or more of magnesium or calcium, and from about 0.1 to about 8.0 atomic % for the cobalt, each calculated as praseodymium, magnesium or calcium and cobalt.

4 Claims, 4 Drawing Figures

CERAMICS HAVING NONLINEAR VOLTAGE CHARACTERISTICS

BACKGROUND OF THE INVENTION

1. Field of the Invention

The present invention relates to ceramics having nonlinear voltage characteristics.

2. Description of the Prior Art

Ceramics having nonlinear voltage characteristics which are made by a process in which zinc oxide is used as a main component and various elements are added thereto as subcomponents, in elemental form or as a compound thereof, are well known. These ceramics, which have a high nonlinearity factor, have been used as surge voltage absorbers or as constant voltage regulating elements.

A current (I) flowing through a nonlinear voltage element at the time of the application of a voltage (V) can be approximated by the following equation:

$$I = (V/C)^\alpha$$

Wherein (C) corresponds to the voltate per mm of the element when the current density is equal to 1 mA/cm$^2$, and ($\alpha$) is the nonlinearity factor of the voltage. It is desirable for (C) to be selected at a suitable value depending on the conditions of use of the nonlinear voltage element, and for ($\alpha$) to be selected to have the largest possible value.

SUMMARY OF THE INVENTION

The present invention provides a ceramic which has a large ($\alpha$) value and a small (C) value. The ceramic according to this invention is made by a process in which (1) zinc oxide (ZnO) is used as a main component and (2) praseodymium (Pr), (3) one or more of magnesium (Mg) or calcium (Ca), and (4) cobalt (Co) are added thereto as subcomponents, in elemental form or as a compound thereof, in amounts calculated as the elements, of from about 0.08 to about 10.0 atomic % for the Pr, from about 0.08 to about 10.0 atomic % for the one or more of Mg or Ca, and from about 0.1 to about 0.8 atomic % for the Co; and the substance thus obtained is thereafter calcined.

DETAILED DESCRIPTION OF THE INVENTION

Figure 1:
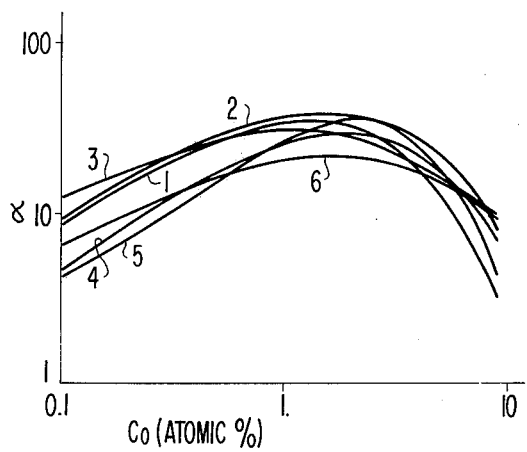
FIGS. 1 to 4 are graphical representations of the characteristics of ceramics according to the present invention, which vary depending on the ratio of the components employed.

The Pr, one or more of magnesium or calcium, and Co comprising the subcomponents are generally added in the form of oxides such as Pr$_6$O$_{11}$, MgO and Co$_2$O$_3$, but they can be added as other compounds of other formulae, e.g., MgCO$_3$ and CaCO$_3$, or as elements per se, which can be changed during the subsequent calcining step into oxides of Pr, one or more of magnesium or calcium, and Co. Examples of other oxide forms include oxides of Co such as CoO, and Co$_3$O$_4$, oxides of Pr such as PrO$_2$ and oxides of Ca such as CaO. In any case, the final proportion of elements other than ZnO present in the ceramics is important, and therefore, the definition of "atomic %" is employed in this specification. On the contrary, Zn must be used in a form of "ZnO".

In the ZnO series ceramic according to this invention, the desired effects are obtained due to the synergistic cooperation of Pr, one or more of Mg or Ca, and Co, i.e., when only one of them is added, the ceramic thus obtained has a small ($\alpha$) value or exhibits a substantially ohmic resistance characteristic, and when only Pr and Co are added, the ceramic has a relatively large ($\alpha$) value but the (C) value is also large. A ceramic where the ($\alpha$) value is large but where the (C) value is small is obtained only when Pr, one or more of Mg or Ca, and Co are employed at an appropriate ratio and in the amount according to this invention.

The reason why the lower limit of the added amount of Pr and one or more of Mg or Ca, is defined to be about 0.08 atomic % is as follows. Although there are some differences due to the calcining temperature, when the amounts of each subcomponent employed are less than the defined limit, the elements thus obtained do not exhibit any remarkable effects due to adding the subcomponents, do not exhibit sufficient characteristics and the characteristics of the resistance element become nonreproducible on a consistent basis.

The reason why the upper limit on the amounts of Pr and one or more of Mg or Ca is defined to be about 10.0 atomic %, respectively, and that of Co is defined to about 8.0 atomic %, is that when the amounts of such subcomponents are greater than that of the defined limit, the ($\alpha$) value tends to decrease and the characteristics of the resulting element become unstable.

The object ceramic compositions of this invention are thus preferably described as follows:

1. Pr: 0.08–10.0 at. % + Mg: 0.08–10.0 at. % + CO: 0.1–8.0 at. % + ZnO: balance;
2. Pr: 0.08–10.0 at. % + Ca: 0.08–10.0 at. % + Co: 0.1–8.0 at. % + ZnO: balance
3. Pr: 0.08–10.0 at. % + (Mg+Ca) 0.08–10.0 at. % + Co: 0.1–8.0 at. % + Zno: balance The calcining step is carried out, for example, in air at a temperature of from about 1150° C to about 1400° C, preferably from 1300° C to 1350° C. When the calcining temperature is lower than about 1150° C, the density of the calcined product is reduced, so that the mechanical strength thereof is weakened and the electrical characteristics thereof become inferior. In contrast, when calcining temperature exceeds about 1400° C, the ($\alpha$) value is reduced, and when the calcining temperature exceeds about 1400° C a uniform calcined material becomes difficult to obtain, and difficulties are also experienced in reproducibility and control of the characteristics of the products. The calcining is typically performed at atmospheric pressure, but such is not to be construed as limitative, as higher and lower pressures can be used, if desired.

This invention will now be described more specifically with respect to several working Examples of the present invention.

EXAMPLE 1

Various ceramics were produced in the following way. The ZnO was added as ZnO and Pr, Mg and Co were added in the form of the compounds Pr$_6$O$_{11}$, MgO and Co$_2$O$_3$, at various composition ratios and quantities. The mixture thus obtained was kneaded and the calcined at 700° C for one hour in air. Each of thus obtained substances was ground, formed into circular discs of a diameter of 16 mm, and calcined at 1300° C for one hour in air. The ceramics thus produced were ground to a thickness of 1 mm, electrodes were attached to both surfaces thereof and then the characteristics of the ceramics were measured. The characteristics of the ceramic resistors thus measured are now indicated, instead of as (C) and (α), by the voltage ($V_1$) at the passage of a current therethrough of 1 mA and by (α), and are described as follows.

FIG. 1 shows variations in (α) values with variation in the amounts of Pr added being taken as a parameter, where the calcining temperature was 1300° C. In FIG. 1, Curves, 1,2,3,4,5 and 6 correspond to the cases where Pr was employed at 0.08, 0.1, 0.3, 1, 3 and 6 atomic %, respectively.

Figure 2:
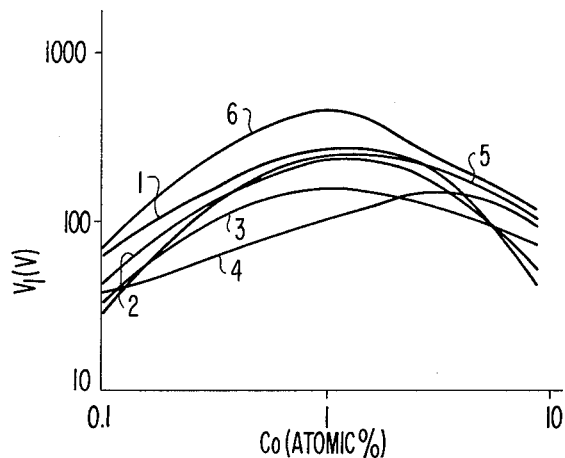

In FIG. 2, various values of ($V_1$) obtained for ceramics which exhibit various (α) values as indicated by Curves 1 through 6 in FIG. 1 are plotted against the quantity of Co employed. From FIGS. 1 and 2, it is apparent that ceramics having a large (α) value and a small (C) value were obtained. Generally, the higher the (α) value the better the results. (C) values widely vary depending upon the conditions employed.

EXAMPLE 2

The procedure of Example 1 was repeated except that CaO was substituted for MgO.

The characteristics of the ceramics formed were measured following the procedure of Example 1.

Figure 3:
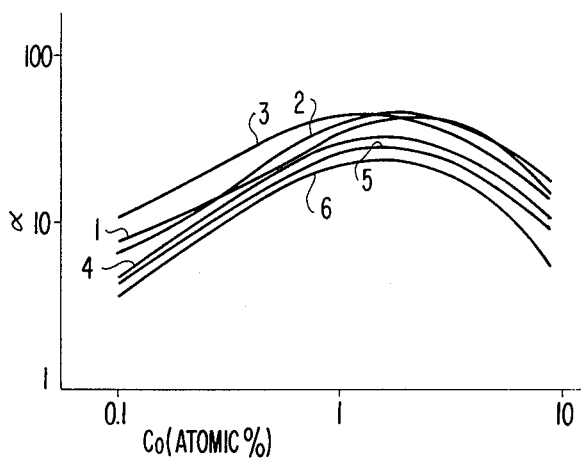

FIG. 3 shows the variations in the (α) values with variations in the amounts of Pr added being taken as a parameter, where the calcining temperature was 1300° C. In FIG. 3, Curves 1,2,3,4,5 and 6 correspond to the cases where Pr was employed at 0.08, 0.1, 3.1, 3 and 6 atomic %, respectively.

Figure 4:
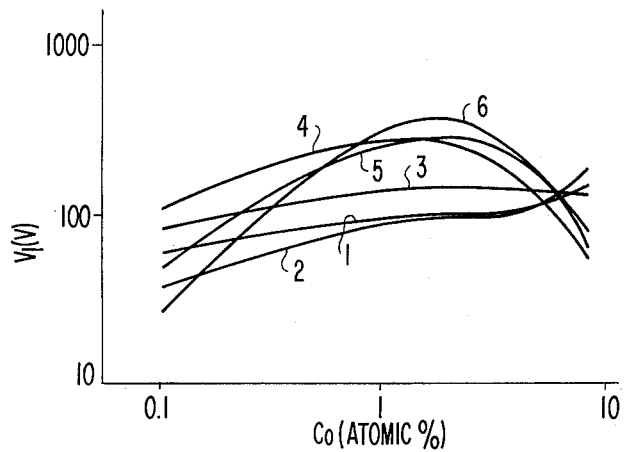

In FIG. 4, various values of ($V_1$) obtained for ceramics which exhibit various (α) values as indicated by curves 1 through 6 in FIG. 3 are plotted against the quantity of Co employed. From FIGS. 3 and 4, it is apparent that ceramics having a large (α) value and a small (C) are obtained.

The ceramics according to this invention can be therefore applied to the protection of various electronic devices rated at low voltages, especially of semiconductor elements such as transistors, diodes or thyristors.

While the invention has been described in detail and with reference to specific embodiments thereof, it will be apparent to one skilled in the art that various changes and modifications can be made therein without departing from the spirit and scope thereof.

What is claimed is:

1. Ceramic compositions consisting essentially of (1) from about 0.08 to about 10.0 atomic % Pr; (2) from about 0.08 to about 10.0 atomic % Mg or from about 0.08 to about 10.0 atomic % Ca; (3) from about 0.1 to about 8.0 atomic % Co; balance ZnO.

2. The ceramic composition of claim 1 containing about 0.08 to about 10.0 atomic % Mg.

3. The ceramic composition of claim 1 containing about 0.08 to about 10.0 atomic % Ca.

4. The ceramic composition of claim 1 containing Mg and Ca in a combined amount of about 0.08 to about 100.0 atomic %.

* * * * *